Figure 1:
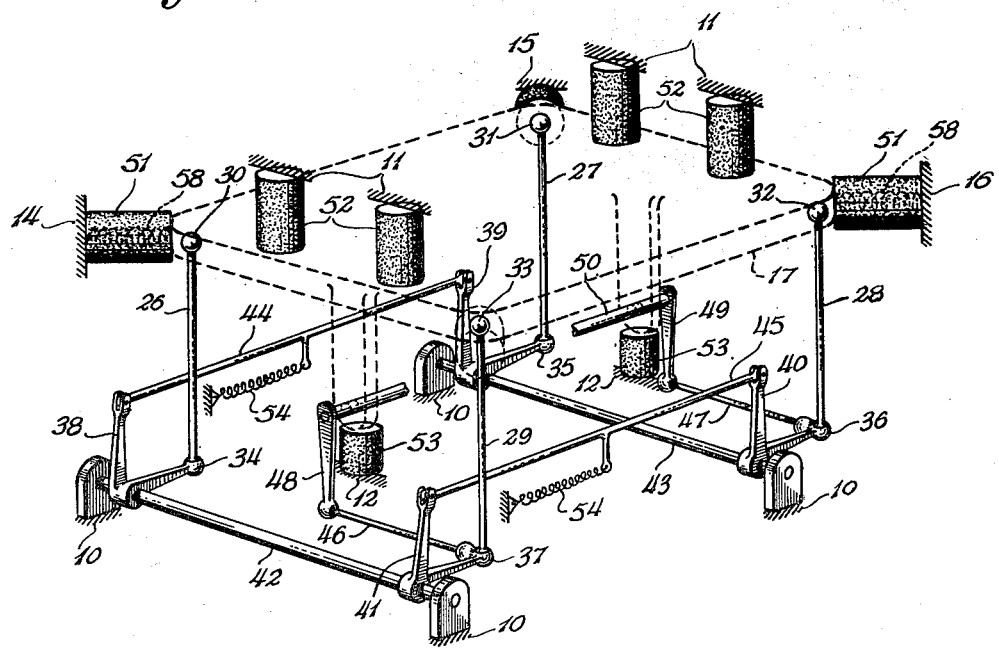

March 15, 1955        L. F. BEACH        2,704,196
INSTRUMENT MOUNTING STRUCTURE
Filed May 18, 1948        4 Sheets-Sheet 1

INVENTOR
LENNOX F. BEACH
BY
ATTORNEY

March 15, 1955 L. F. BEACH 2,704,196
INSTRUMENT MOUNTING STRUCTURE
Filed May 18, 1948 4 Sheets-Sheet 2

INVENTOR
LENNOX F. BEACH
BY Herbert H. Thompson
his ATTORNEY.

March 15, 1955 L. F. BEACH 2,704,196
INSTRUMENT MOUNTING STRUCTURE
Filed May 18, 1948 4 Sheets-Sheet 4

INVENTOR
LENNOX F. BEACH
BY
Herbert H. Thompson
his ATTORNEY

United States Patent Office 2,704,196
Patented Mar. 15, 1955

2,704,196

INSTRUMENT MOUNTING STRUCTURE

Lennox F. Beach, Port Washington, N. Y., assignor to The Sperry Corporation, a corporation of Delaware Application May 18, 1948, Serial No. 27,717

6 Claims. (Cl. 248—358)

This invention relates to a structure for mounting instruments on mobile objects subject to vibration and shock. The structure of the invention is provided to absorb or cushion the effect of vibrations in or shocks on the object so that the instrument carried thereby is relatively undisturbed. While the instrument supported by the improved shock mounting structure may be of any character, an instrument such as a gyroscopic instrument providing an azimuth reference in the form of a gyro compass is herein shown as supported by the structure. This type of gyroscopic instrument provides two mutually perpendicular horizontal axes and a vertical axis of support of its sensitive element. The horizontal axes of the instrument are arranged in parallel relation to the horizontal fore and aft and athwartship axes respectively of the mobile object. The vertical axis of the instrument is also parallel to the azimuth axis of the mobile object.

One of the features of the invention is the provision of a supporting structure of neutral equilibrium for an instrument that permits lateral and vertical movements thereof relative to the object.

The neutral equilibrium supporting structure of the improved mounting assembly is constituted of a plurality of upright, parallel links that are universally connected at the respective ends thereof to a frame carrying the instrument and a mounting means that is movable between the top and bottom parts of the stand or binnacle. The mounting means is connected to the binnacle or stand through a yielding connection. When subject to shocks or vibrations, the links permit relative lateral and vertical motions of the frame with respect to the stand or binnacle.

A further feature of the invention resides in the means provided in conjunction with the link supported frame for preventing relative movement between the stand or binnacle and the frame about a vertical axis while permitting movement of the frame laterally and vertically through the links.

Still a further feature of the invention is provided by the shock absorbing means interconnecting the link supported frame and the interior parts of the stand or binnacle. The supporting portion of the assembly which includes the neutral equilibrium, parallel, links offers no resistance to the vibrations or shocks occurring on the mobile object on which the instrument is utilized. In the improved structure, the vibrations or shocks of the object are resisted or absorbed only by the shock absorbing means.

Figure 2:
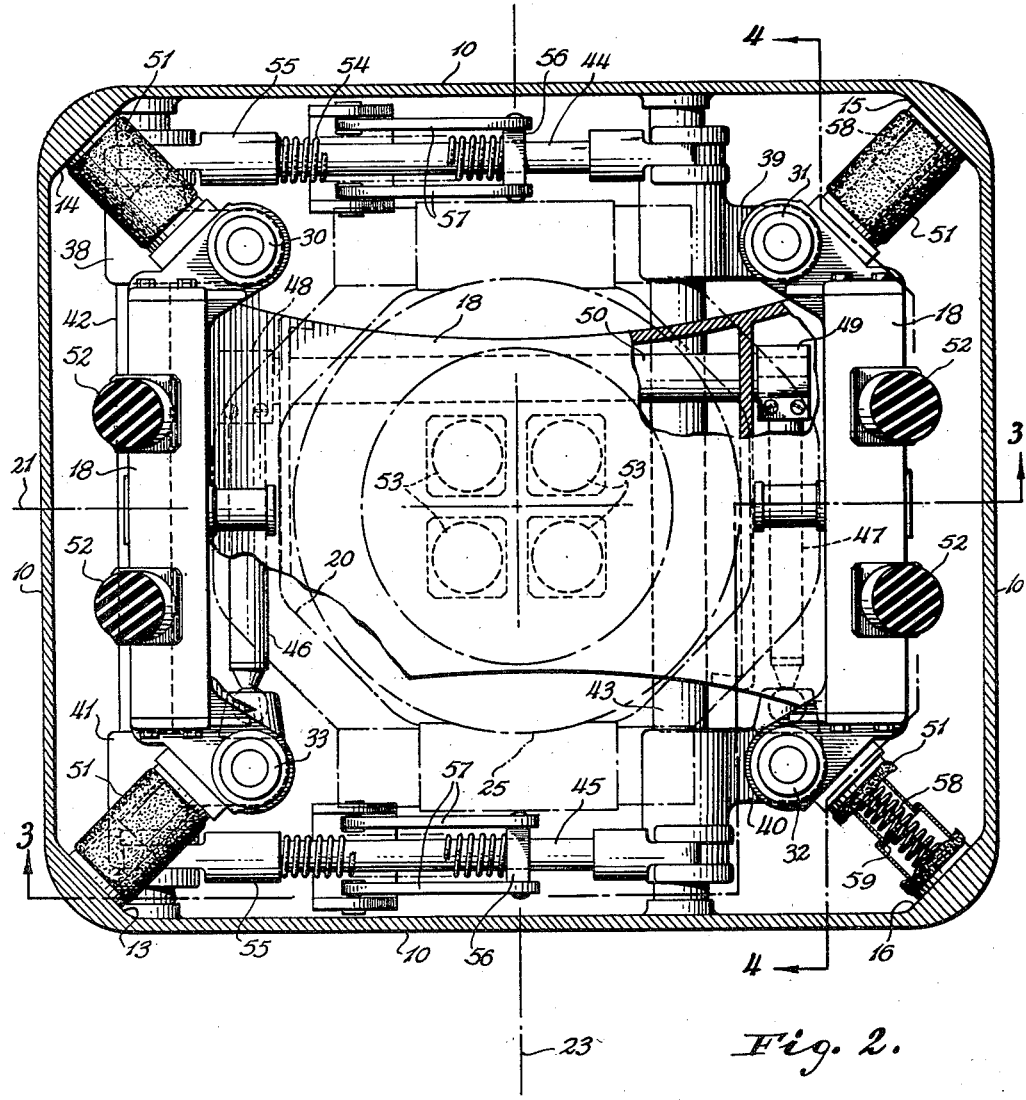
Figure 3:
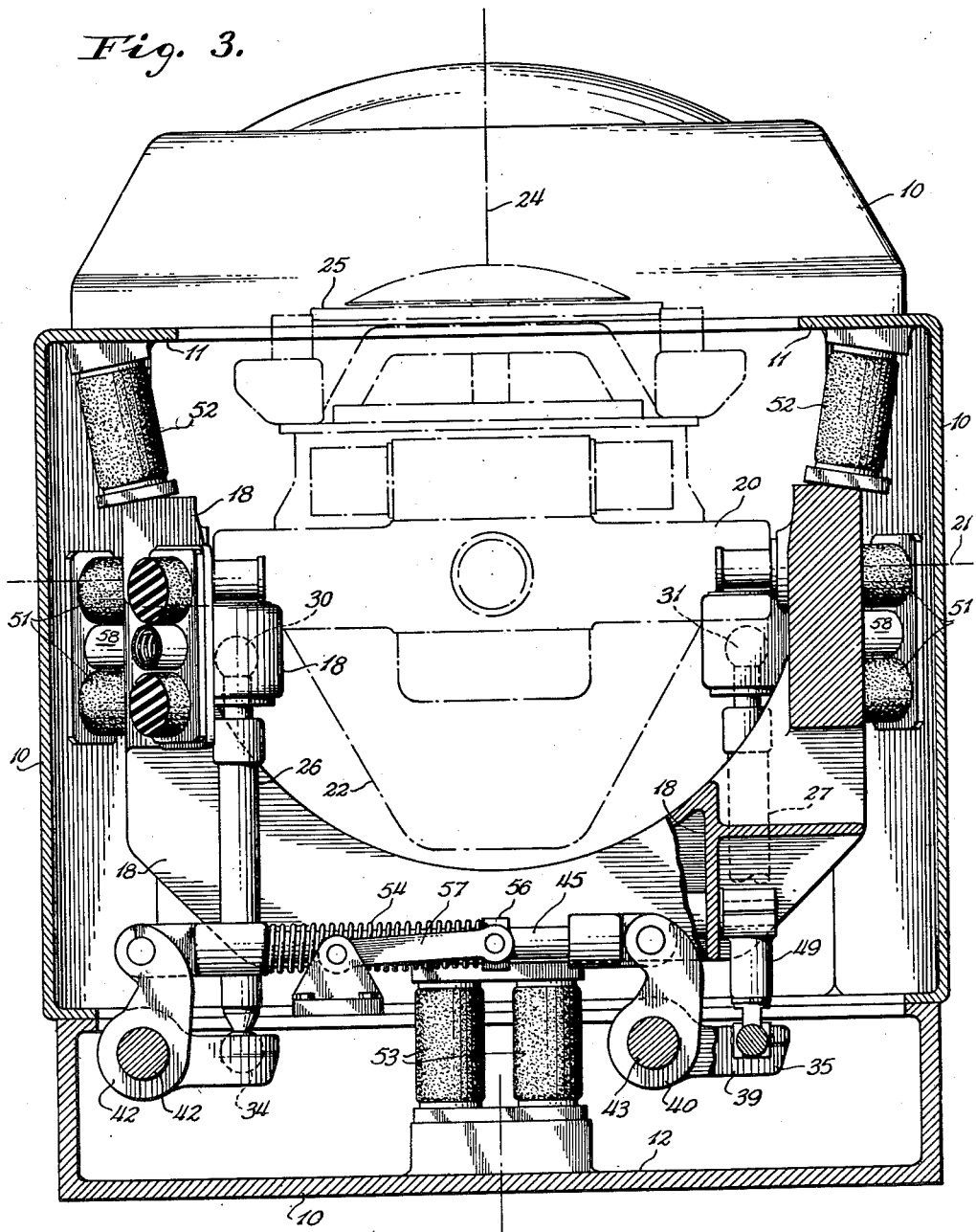
Figure 4:
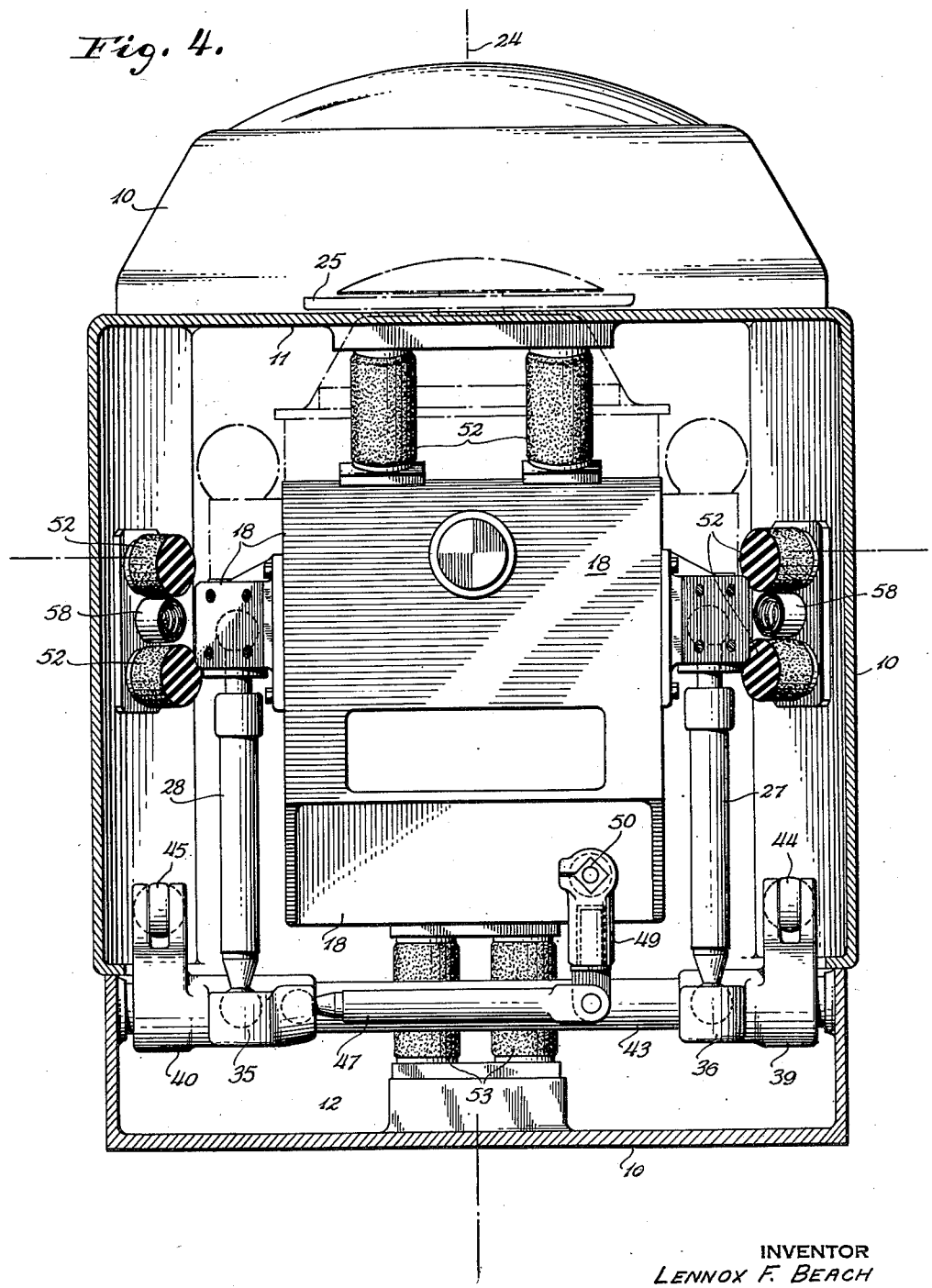

Other features and structural details of the invention will be apparent from the following description when read in relation to the accompanying drawings, wherein:

Fig. 1 is a schematic view showing the elements of the improved shock absorbing structure, Fig. 2 is a plan view of a gyroscopic instrument of the gyro compass type showing a practical embodiment of the improved mounting structure, Fig. 3 is a section view taken on line 3—3, in Fig. 2, and Fig. 4 in a section view taken on line 4—4, in Fig. 2.

With reference to the drawings, the improved shock absorbing structure is shown to include a stand or binnacle indicated at 10 for the instrument carried by the mobile object (not shown). The stand or binnacle 10 is suitably fixed to the object employing the instrument. The fixed stand 10 of the structure includes a top interior part or wall 11, a bottom interior part or wall 12, and side interior parts or walls 13, 14, 15 and 16. The walls 11 through 16 form a unitary framework that may provide a housing in which the instrument is enclosed. In the form of the invention shown in Figs. 2 through 4, the framework provides a binnacle that houses the gyroscopic instrument for use on a mobile object such as a ship.

A frame carrying the instrument is shown in Fig. 1 in the form of a table 17. In this view the instrument per se is omitted for purpose of clarity in the illustration of the fundamental components of the improved structure. In the practical form of the invention shown in Figs. 2 to 4 inclusive, the frame supporting the instrument is indicated at 18. In Figs. 2 to 4, the gyroscopic instrument or gyro compass carried by the frame includes a gimbal ring 20, Fig. 3, having freedom about a horizontal axis 21 that is parallel to the roll or fore and aft axis of the mobile object. Ring 20 supports a gyroscopic frame 22, Fig. 3, with freedom about a horizontal axis 23, Fig. 2, that is parallel to the athwartship or pitch axis of the object. The frame 22 provides a mounting for a gyroscopic sensitive element (not shown) having freedom about a vertical axis 24 that is parallel to the azimuth axis of the craft. A compass card 25 controlled by the gyroscopic sensitive element is indicated in Figs. 3 and 4. Thus, the described instrument carried by the improved structure has mutually perpendicular horizontal axes and a vertical axis. The instrument is employed on a ship or object having fore and aft, athwartship and azimuth axes which respectively correspond to the two horizontal axes and the vertical axis of the instrument. In accordance with the invention, the frame 18 is supported on the stand or binnacle 10 by means including a structure of neutral equilibrium comprising a plurality of upright, parallel links universally connected at one of the respective ends thereof to the frame 18. The provided mounting means shown in the drawings further includes a plurality of mounting elements yieldingly connected to the stand to which the other of the respective ends of the parallel links are universally connected so that the frame is movable laterally and vertically between the top and bottom parts of the stand.

As shown in the drawing, the mounting means connecting the stand 10 and frame 18 or table 17 permits lateral and vertical movements of the frame relative to the stand. The mounting shown includes two parallel motion linkages having four normally vertical or upright parallel links of equal lengths universally connected at the first of the respective ends thereof to the frame 18. These links are indicated in the drawing at 26, 27, 28 and 29. The connection of the links to the frame 18 is provided by the respective ball and socket joints indicated in Fig. 2 at 30, 31, 32 and 33. The links are similarly connected at the opposite ends thereof to a plurality of mounting elements within the stand or binnacle 10 as indicated by the ball and socket joints 34, 35, 36 and 37. The mounting elements are connected to the stand 10 by a system of bell cranks indicated at 38, 39, 40 and 41. Parallel cranks 38 and 41 are fixedly connected to a shaft 42 pivotally mounted in the stand or binnacle 10. Parallel cranks 39 and 40 are fixedly connected to a shaft 43 parallel to shaft 42 that is likewise pivotally mounted in the stand or binnacle 10. Cranks 38 and 39 are connected by a rod 44. Cranks 40 and 41 are connected by a rod 45 that is parallel to rod 44. The socket connections 34, 35, 36 and 37 for the links on the cranks 38, 39, 40 and 41 respectively are situated in a common horizontal plane which moves vertically between the top and bottom parts of the stand 10 upon operation of the bell crank supporting system. The cranks 38, 41, 39, 40 and links 44, 45 provide an additional parallel motion mechanism at the bottom part of the stand 10 that connect with the lowermost ends of the respective upright supporting links 26, 27, 28 and 29. The mounting elements provided are constituted by the housings of the universal connections 34, 35, 36 and 37. The housings are yieldingly connected to the stand by a yielding connection provided by spring 54. The described structure permits lateral and vertical movements of the frame 18 or table 17 relative to the stand or binnacle 10. The links 26, 27, 28 and 29 provide a structure of neutral equilibrium that supports the frame 18 on the described mounting means. In performing this function, the links offer no resistance to the vibrations or shocks occurring on the object on which the instrument is utilized.

In order to prevent the structure from having freedom about the vertical axis 24 of the instrument shown in Figs. 2 to 4, a means in the form of a further parallel motion mechanism or linkage is provided between the frame 18 and the stand through the described mounting means for the frame suporting links. This arrangement with the heretofore described upright linkage permits only lateral and vertical translational movements of the frame relative to the stand. As shown, the further parallel motion linkage includes parallel horizontal links 46 and 47, parallel upright cranks 48 and 49, and shaft 50. In this arrangement, the shaft 50 is pivotally mounted on a lower extension of the frame 18 or table 17. The cranks 48 and 49 are fixedly connected to the shaft 50 at the respective ends thereof. Links 46 and 47 have equal lengths. Link 46 is universally connected by ball and socket joints at the respective ends thereof to crank 48 and bell crank 41. Link 47 is similarly connected between crank 49 and bell crank 40. With the described linkage, relative motion between the frame 18 and stand 10 is confined to lateral and vertical translation. The further parallel linkage prevents rotation of the frame 18 relative to the binnacle 10 about the vertical axis 24.

The improved structure also includes cushioning or shock absorbing means interconnecting the side interior parts or walls of the stand 10 and the frame 18 or table 17. These laterally positioned cushions as shown, take the form of rubber cylinders of which eight are employed in the practical embodiment of the invention illustrated in Figs. 2 to 4. The cylinders 51 are suitably connected at the respective ends thereof to the side parts or walls of the stand or binnacle 10 and to the frame 18 as particularly shown in Fig. 2. Two of the cylinders 51 are horizontally situated in each of the corners of the binnacle. The cylinders normally maintain the frame 18 so that the supporting links 26, 27, 28 and 29 for the mounting thereof are vertically positioned. With laterally directed vibrations or shocks resulting in corresponding lateral motion between the frame and binnacle, the cylinders 51 operate to resist the motion, to cushion the effect of the disturbing vibration or shock on the frame.

Similar cushioning or shock absorbing means are employed between the top part of the stand and the frame and the bottom part of the stand and the frame. The top rubber cylinders utilized in the improved structure are indicated at 52. The bottom cylinders are indicated at 53. As shown in Figs. 2 to 4, four top cylinders 52 and four bottom cylinders are employed in the structure. Cylinders 52 and 53 interconnect the frame and stand of the structure and operate with the mounting to absorb vertically directed vibrations or shocks and to return the frame to its normal position relative to the binnacle upon termination of the disturbance.

The hereinbefore mounting means of the combination is also connected to the stand or binnacle by a spring which provides a means for counterbalancing the weight of the frame 18, the mounting and the instrument on the cushioning means provided by the vertical bottom cylinders 53 between the binnacle 10 and the frame 18. Such means is provided, in the present instance, by a pair of springs 54 whose ends connect the respective rods 44, 45 and the base or binnacle 10 to take the weight of the mounting, the frame and the instrument. As shown in Figs. 2 to 4, the springs 54 press against collars 55 on the respective rods 44, 45 to exert a force on the bell cranks 38, 39, 40 and 41 to balance the weight of the noted parts thereon so that the cylinders 53 are not under any initial compression. The fixed ends of the springs 54 are positioned by a sleeve 56 on the respective rods 44, 45 that is connected or anchored to the stand or binnacle 10 of the structure by a link 57. In the normal position of the structure as shown in the drawings, the rubber cushions 51, 52 and 53 are neither under compression nor tension. The shock absorbing means provides a normally unbiased interconnection between the interior parts of the stand and the link supported frame.

As herein shown, additional shock absorbing means in the form of preloaded springs 58 of the coil type are employed between the side parts of the stand and the frame that are particularly effective to resist lateral accelerations of 32.17 feet per second or less. Stops 59, Fig. 2, prevent the spring assembly from exerting a force on the neutrally supported frame. Any slight movement from a condition of support where the links 26, 27, 28 and 29 are vertical is immediately resisted by the preloaded springs 58. Vibrations or shocks over the noted value of 1(g) are quite severe, so that the springs 58 are particularly provided to reduce the extent of the relative lateral motion between the frame and stand in absorbing the normally encountered range of disturbances.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A shock absorbing mounting structure for instruments employed on mobile objects including a stand having top, bottom and side interior parts, a frame within said stand for supporting the instrument, a plurality of upright, parallel links universally connected at the first respective ends thereof to said frame, first means including a plurality of mounting elements yieldingly connected to said stand having the second respective ends of said links universally connected thereto so that said frame is movable laterally and vertically between said top and bottom parts of said stand, second means connected between said frame and said first means for preventing relative movement theerbetween about a vertical axis while permitting motion of said frame laterally and vertically through said links, and shock absorbing means providing a normally unbiased interconnection between the top, bottom and side interior parts of said stand and said link supported frame.

2. A shock absorbing mounting structure as set forth in claim 1, wherein said second means includes first and second horizontal, parallel links; first and second upright, parallel cranks; the first ends of said horizontal links being universally connected to said stand through said first means, the second ends of said horizontal links being universally connected to the ends of said cranks, and a shaft fixedly connected to said first and second cranks, said shaft extending horizontally between said cranks and being pivotally mounted upon said frame for movement about a horizontal axis.

3. A shock absorbing mounting structure for instruments employed on mobile objects including a stand having top, bottom and side interior parts, a frame within said stand for supporting the instrument, a plurality of upright, parallel links of equal length universally connected at the first respective ends thereof to said frame, means including a plurality of mounting elements universally connecting the second respective ends of said links to said stand, said means further including a plurality of bell cranks, supporting said mounting elements, said bell cranks being pivotally mounted on said stand to effect simultaneous movement of said upright links by equal amounts between the top and bottom parts of said stand, spring means for counterbalancing the weight of said frame and instrument upon said plurality of bell cranks, second means between the link supported frame and said bell cranks for preventing relative movement therebetween about a vertical axis between said top and bottom parts of said stand while permitting motion of said frame laterally and vertically through said links, and shock absorbing means providing a normally unbiased interconnection between the top, bottom and side interior parts of the stand and the link supported frame.

4. A shock absorbing mounting structure for instruments employed on mobile objects including a stand having top, bottom and side interior parts, a frame within said stand for supporting the instrument, a structure of neutral equilibrium supporting said frame in said stand comprising a plurality of upright, parallel links universally connected at the first respective ends thereof to said frame, first means including a plurality of mounting elements to which the second respective ends of said links are universally connected so that said frame is movable laterally and vertically between said top and bottom parts of said stand, a yielding connection between said first means and said stand, second means connected between said frame and said first means for preventing relative movement therebetween about a vertical axis while permitting motion of said frame laterally and vertically through said links, and shock absorbing means providing a normally unbiased interconnection between the interior parts of said stand and said link supported frame.

5. A shock absorbing mounting structure for instruments employed on mobile objects including a stand having top, bottom and side interior parts, a frame for carrying the instrument, mounting means yieldingly connected to said stand movable between the top and bottom parts thereof, a structure of neutral equilibrium supporting said frame in said stand comprising a plurality of upright, parallel links of equal length universally connected at the respective ends thereof to said frame and said mounting means, means connected to said frame for preventing relative movement between the stand and link supported frame about a vertical axis while permitting motion of said frame laterally and vertically through said links, and shock absorbing means providing a normally unbiased interconnection between the interior parts of the stand and the link supported frame.

6. A shock absorbing mounting structure for gyro compasses including a binnacle having top, bottom and side interior parts, a frame for carrying the gyro compass, mounting means movable between the top and bottom parts of the binnacle, a yielding connection between said binnacle and said mounting means, a structure of neutral equilibrium supporting said frame within the binnacle comprising a plurality of upright, parallel links of equal length universally connected at the respective ends thereof to said frame and said mounting means, a parallel motion mechanism connected to said frame for preventing relative movement between the binnacle and said link supported frame about a vertical axis while permitting motion of said frame laterally and vertically through said links, and shock absorbing means providing a normally unbiased interconnection between the interior parts of the binnacle and link supported frame.

References Cited in the file of this patent

UNITED STATES PATENTS

| Number | Name | Date |
|---|---|---|
| 1,243,358 | Stoddard | Oct. 16, 1917 |
| 1,319,066 | Grob | Oct. 21, 1917 |
| 1,540,355 | Mathes | June 2, 1925 |
| 1,540,720 | Buckbee | June 2, 1925 |
| 1,880,982 | Rawlings | Oct. 4, 1932 |
| 1,880,992 | Sparling | Oct. 4, 1932 |
| 2,099,375 | Seward, Jr. | Nov. 16, 1937 |
| 2,172,706 | Julien | Sept. 12, 1939 |
| 2,376,277 | Rouy | May 15, 1945 |
| 2,397,804 | Nakken et al. | Apr. 2, 1946 |

FOREIGN PATENTS

| Number | Country | Date |
|---|---|---|
| 516,245 | Great Britain | Dec. 28, 1939 |